United States Patent
Suvanen

(10) Patent No.: US 6,545,985 B1
(45) Date of Patent: Apr. 8, 2003

(54) ECHO CANCELLATION MECHANISM

(75) Inventor: Jyri Suvanen, Helsinki (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 09/420,077

(22) Filed: Oct. 18, 1999

Related U.S. Application Data

(63) Continuation of application No. PCT/FI98/00332, filed on Apr. 15, 1998.

(30) Foreign Application Priority Data

Apr. 18, 1997 (FI) .................................................. 971680

(51) Int. Cl.[7] .............................. H04B 3/20; H04B 1/38; H04M 9/08
(52) U.S. Cl. .................. 370/286; 379/406.01; 455/570; 455/296
(58) Field of Search ................................ 370/286–289, 370/466, 351–356, 522–523, 252, 290; 379/406, 407, 410, 406.01–406.1; 455/422, 560, 570, 296, 561; 375/346, 241

(56) References Cited

U.S. PATENT DOCUMENTS

| 5,608,779 A | | 3/1997 | Lev | |
|---|---|---|---|---|
| 5,768,308 A | * | 6/1998 | Pon et al. | 370/287 |
| 5,835,486 A | * | 11/1998 | Davis et al. | 370/287 |
| 6,011,846 A | * | 1/2000 | Rabipour et al. | 379/406 |
| 6,064,873 A | * | 5/2000 | Eriksson et al. | 379/410 |

FOREIGN PATENT DOCUMENTS

| EP | 0 748 138 | 12/1996 |
|---|---|---|
| FI | 952833 | 9/1996 |
| FI | 951807 | 10/1996 |
| WO | WO 96/19907 | 6/1996 |
| WO | WO 96/32823 | 10/1996 |
| WO | WO 96/42142 | 12/1996 |

OTHER PUBLICATIONS

Copy of International Search Report for PCT/FI98/00332.

* cited by examiner

Primary Examiner—Steven Nguyen
(74) Attorney, Agent, or Firm—Squire, Sanders & Dempsey L.L.P.

(57) ABSTRACT

An arrangement for cancelling an echo returning to a first mobile station (MS1) from a second mobile station (MS2). The arrangement comprises tandem free operation (TFO) and an acoustic echo canceller (AEC) to which criteria have been defined, upon fulfillment of which the echo canceller replaces an uplink speech signal of the second mobile station (MS2) by comfort noise (CN) in a second coding format. In accordance with the invention, the echo canceller (AEC) generates additional information (AI) if the tandem free operation (TFO) is active and if criteria for replacing the speech signal with the comfort noise are fulfilled at the same time. In response to said additional information (AI), a first transcoder (TRAU1) encodes the speech signal to be transmitted to the first mobile station (MS1) by using the comfort noise (CN) that is generated by the echo canceller (AEC) and that is in the second coding format.

7 Claims, 6 Drawing Sheets

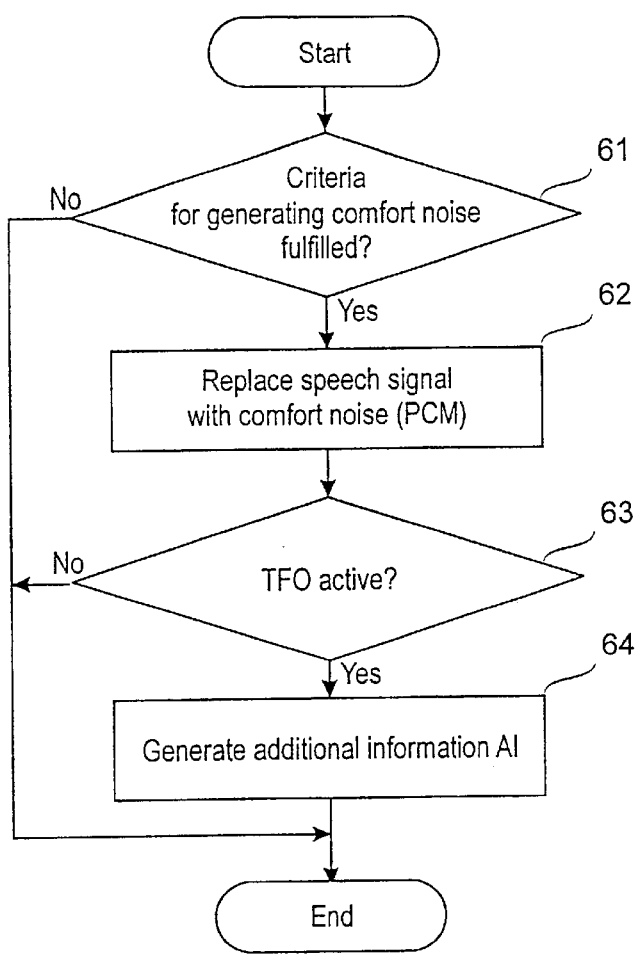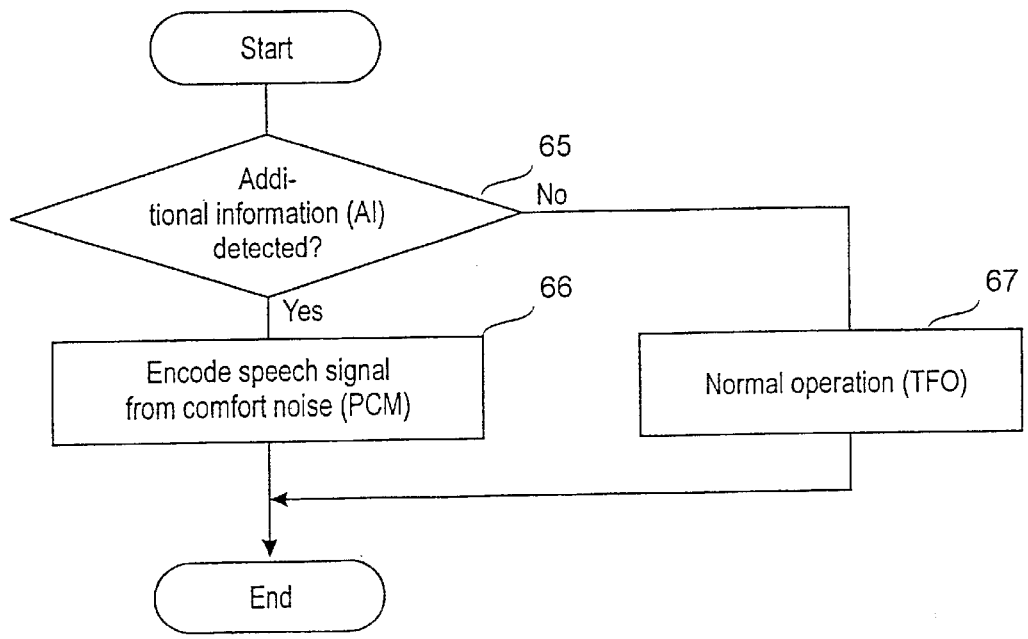
Fig. 6

ECHO CANCELLATION MECHANISM

This is a continuation of application under 37 C.F.R. §1.53(b) of prior international application number PCT/FI98/00332 filed on Apr. 15, 1998 entitled ECHO CANCELLATION MECHANISM, which designated the United States.

BACKGROUND OF THE INVENTION

The invention relates to an arrangement for cancelling an echo in a mobile system, an echo canceller in a mobile system and a transcoder.

Referring to FIG. 1, in current telephone systems, a telephone exchange and a speech processing unit are interconnected via a logical and/or a physical interface. Speech is transmitted over this interface in a packed form, i.e. companded, for example as PCM samples coded in accordance with the A or the $\mu$ law. Generally, at an interface of this type, the bit rate for a speech channel is 64 kbits/s. A well known example of a system of this type is the interface between a mobile exchange MSC in the GSM system and a transcoder unit TRAU (Transcoder and Rate Adaptation Unit), the interface being referred to as an A interface. When a call is established in a mobile system between two mobile stations, for example MS1 and MS2, speech originating from the mobile station MS1 is coded twice, first in the mobile station MS1 and then in a transcoder unit TRAU2. This situation is referred to as tandem coding. Tandem coding degrades the speech quality.

Various solutions have been presented for preventing tandem coding. Such a mechanism is disclosed in reference 1. Within the scope of the present application, preventing tandem coding is referred to as TFO (Tandem Free Operation). If the TFO is active, speech is transmitted over the A interface as speech parameters and not as samples in accordance with the A or the $\mu$ law. According to reference 1, it is also possible to transmit both representations of speech simultaneously in parallel in the speech channel. In FIG. 1, a conductor 11 drawn with a solid line illustrates speech coded into PCM samples, and a conductor 12 drawn with a dashed line illustrates speech coded into a parametric format by means of a speech decoder in the mobile system.

Mobile stations bring about an acoustic echo audible to the other party. FIG. 1 presents a situation of this type wherein speech spoken to a mobile station MS1 is encoded by means of a speech encoder in the mobile station. The encoded speech propagates to a second mobile station MS2, where the encoded speech is decoded and delivered to a loudspeaker in the mobile station. Part of the speech loops back to a mobile station MS1 user as an echo via a microphone in the mobile station MS2. Normally, the echo should be cancelled in the mobile station, but because of a deficient implementation of echo cancellation, situations occur where a low-level but yet disturbing acoustic echo may be transmitted. This residual echo can be cancelled by means of an acoustic echo canceller on the mobile telephone network side. Early echo cancellers prevented the echo from returning to the speaker by simply cutting off a signal path when it was detected that the echo must be cancelled. However, the speaker may find a total silence disturbing as he may think that the connection is broken. The latest echo cancellers therefore send so called comfort noise (CN) to the speaker, the comfort noise being generated by taking samples from the background noise of a B subscriber. The echo canceller AEC can be a separate network element. Alternatively, an echo cancellation operation can be located or integrated in connection with another network element. For the sake of simplicity, both the "old" type of silence and the "new" type of actual comfort noise are hereinafter referred to as comfort noise.

When the TFO operation is active, the speech parameters are transmitted between the MS1 and the MS2 directly without coding them into A-law or $\mu$-law samples. In FIG. 1, this operation is illustrated by a conductor 12. If at least one of the mobile stations generates an acoustic echo, the echo is transmitted to the other mobile station unless the acoustic echo canceller (AEC) is used.

Referring to FIG. 2, an alternative is to develop comfort noise directly in a parametric format, whereby original speech samples are replaced with the parametric presentations illustrating the comfort noise. A solution of this type is presented in reference 2. A problem with this solution is that generating noise in this manner must be carried out in a different manner for each speech coding method. In that case, a comfort noise analyzing operation in the mobile station, or, alternatively, separate encoding and comfort noise analyzing operations in the echo canceller are needed for processing at a parametric level.

Referring now to FIG. 3, a known mechanism is to prevent the TFO operation when the AEC is active. The mechanism in FIG. 3 operates as described below. The AEC monitors downlink speech activity (MSC2→MS2). When the AEC detects downlink speech activity, it replaces an uplink speech signal (MS2→MSC2) by comfort noise. The comfort noise is generated as PCM samples. At least one problem with this mechanism is that tandem free operation must be renegotiated between the transcoder units TRAU always after the use of an AEC. This technique dramatically degrades the speech quality.

Yet another known technique is not to use the AEC if the TFO is active (FIG. 1, conductor 12). In this case, a disturbing acoustic echo is clearly audible.

BRIEF DESCRIPTION OF THE INVENTION

An object of the invention is thus to provide an apparatus for solving the above described problems. A particular object of the invention is to allow the operation of an echo canceller without at the same time disturbing tandem coding cancellation. The objects of the invention are achieved by apparatuses which are characterized by what is stated in the independent claims. The preferred embodiments of the invention are disclosed in the dependent claims.

The invention is based on the fact that speech parameters transmitted in a mobile telephone network must be changed in some way in order to cancel an echo. At the same time, tandem free operation is desired to be maintained active in order to maintain the speech quality as good as possible.

A potential solution to this problem is presented in FIG. 4. This solution is based on the fact that the speech coding method employed in TFO is used for coding comfort noise into a parametric format and for replacing the original speech parameters by the parameter presentations illustrating the comfort noise. In this embodiment, an additional encoding operation is needed for the echo canceller.

A preferred embodiment of the invention presented in FIG. 5 is based on the fact that a comfort noise generation operation that generates comfort noise as PCM samples (i.e. as A-law or $\mu$-law samples) is located in an echo canceller. In a call between two mobile stations (or in general in a call whose all parties are capable of the TFO operation), the tandem free operation (TFO) is active, i.e. speech is transmitted in a parametric format between transcoders. In order to achieve this, it is also assumed that the PCM samples (i.e. the A/µ-law samples as presented in reference 1) are transmitted simultaneously with the parameters. In addition, it is assumed that some kind of frame-form signalling information is also transmitted between the transcoders.

It is an advantage of the echo cancellation of the invention that it also cancels the acoustic echo during the TFO operation. It is a particular advantage of the preferred embodiment of the invention that not much additional processing is required. Another advantage is that the invention enables the use of the same comfort noise generation means irrespective of the codecs used in the mobile system.

BRIEF DESCRIPTION OF THE DRAWINGS

In the following, the invention will be described in more detail by means of preferred embodiments with reference to the accompanying drawings, in which:

FIG. 6 is a flow diagram illustrating the operation of the invention.

DETAILED DESCRIPTION OF THE INVENTION

Figure 1:
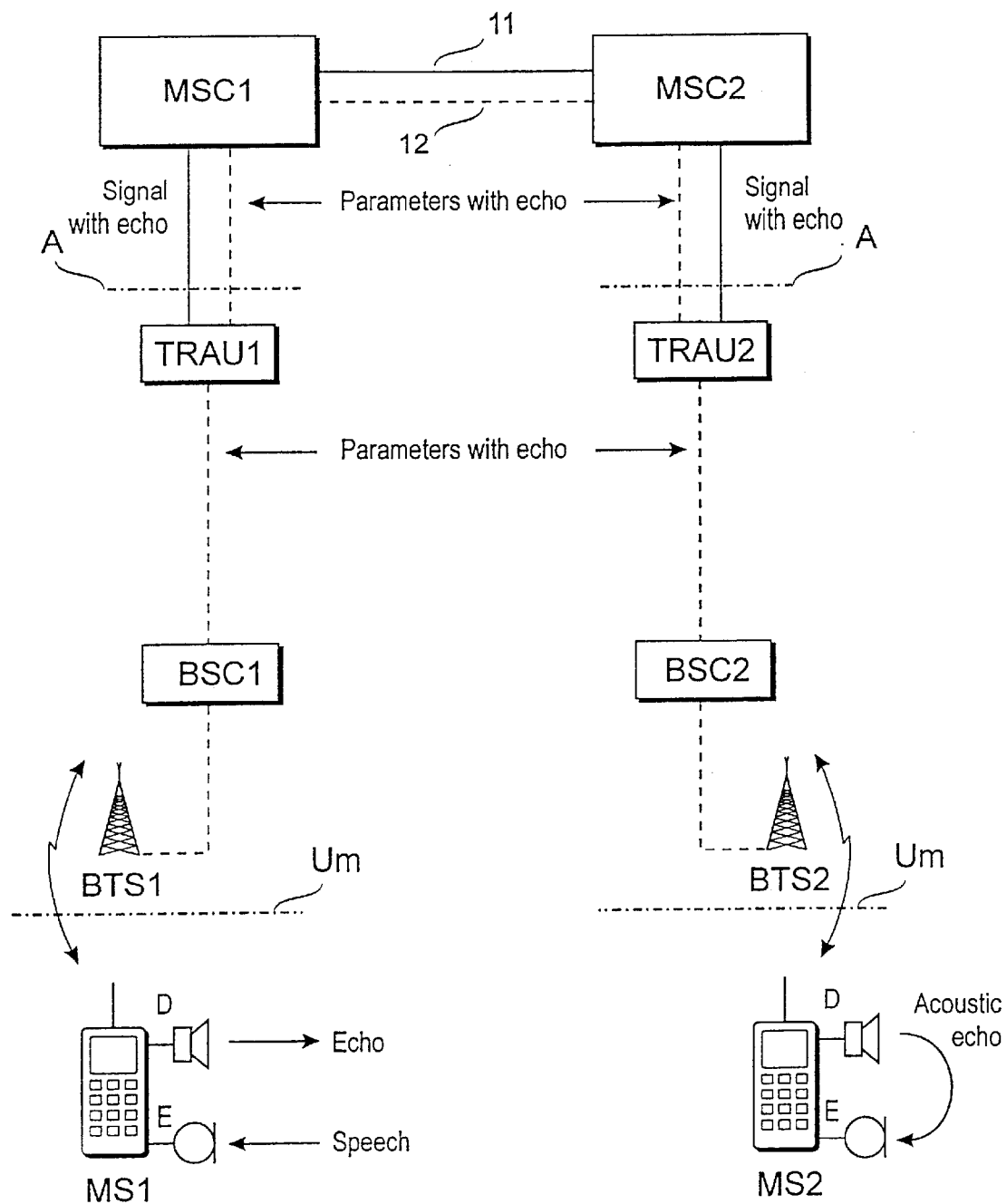
FIG. 1 presents the generation of an acoustic echo and parts of a mobile system essential for the description of the invention.
Figure 2:
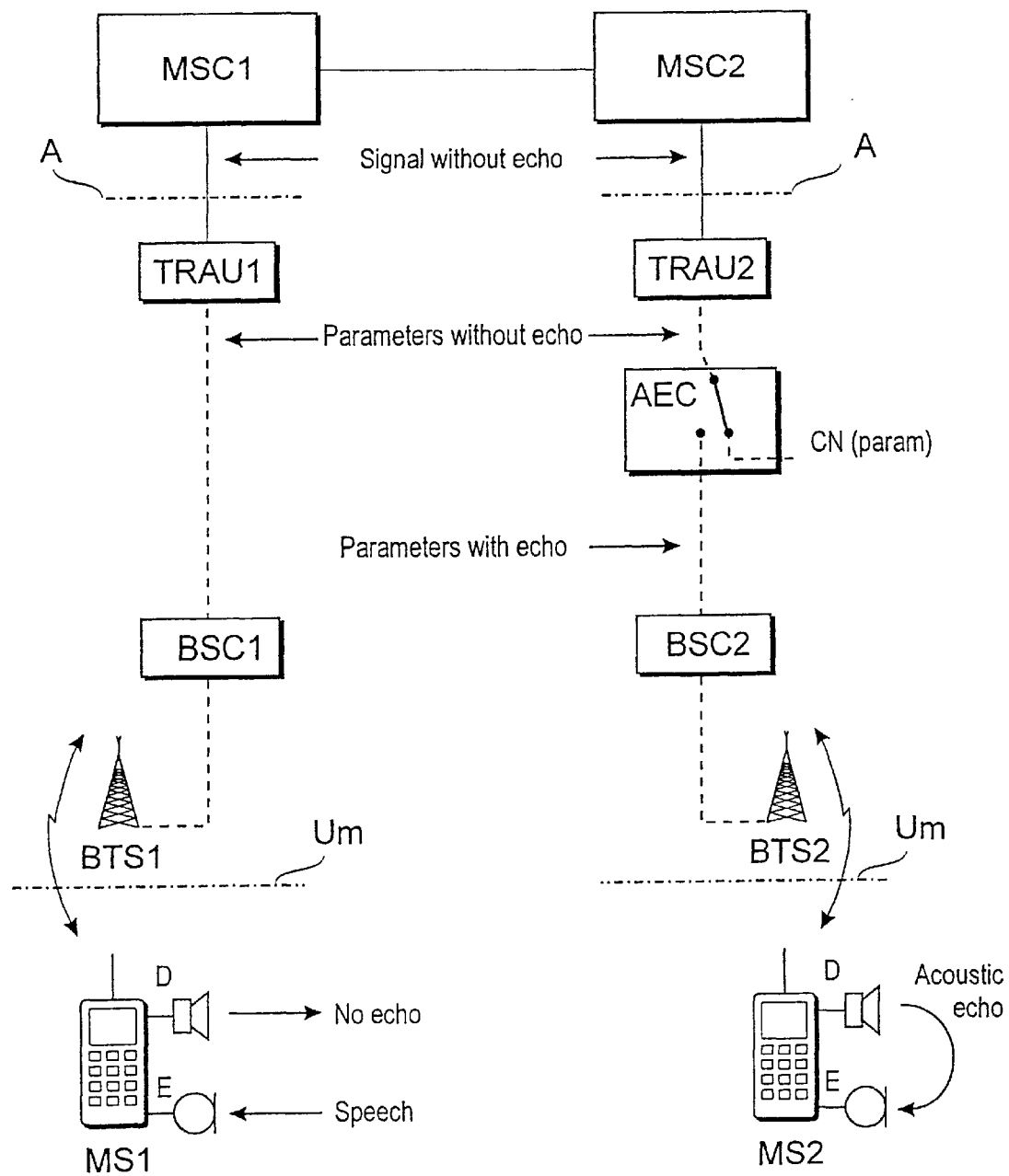
FIGS. 2 to 3 illustrate known mechanisms for cancelling an acoustic echo.
Figure 3:
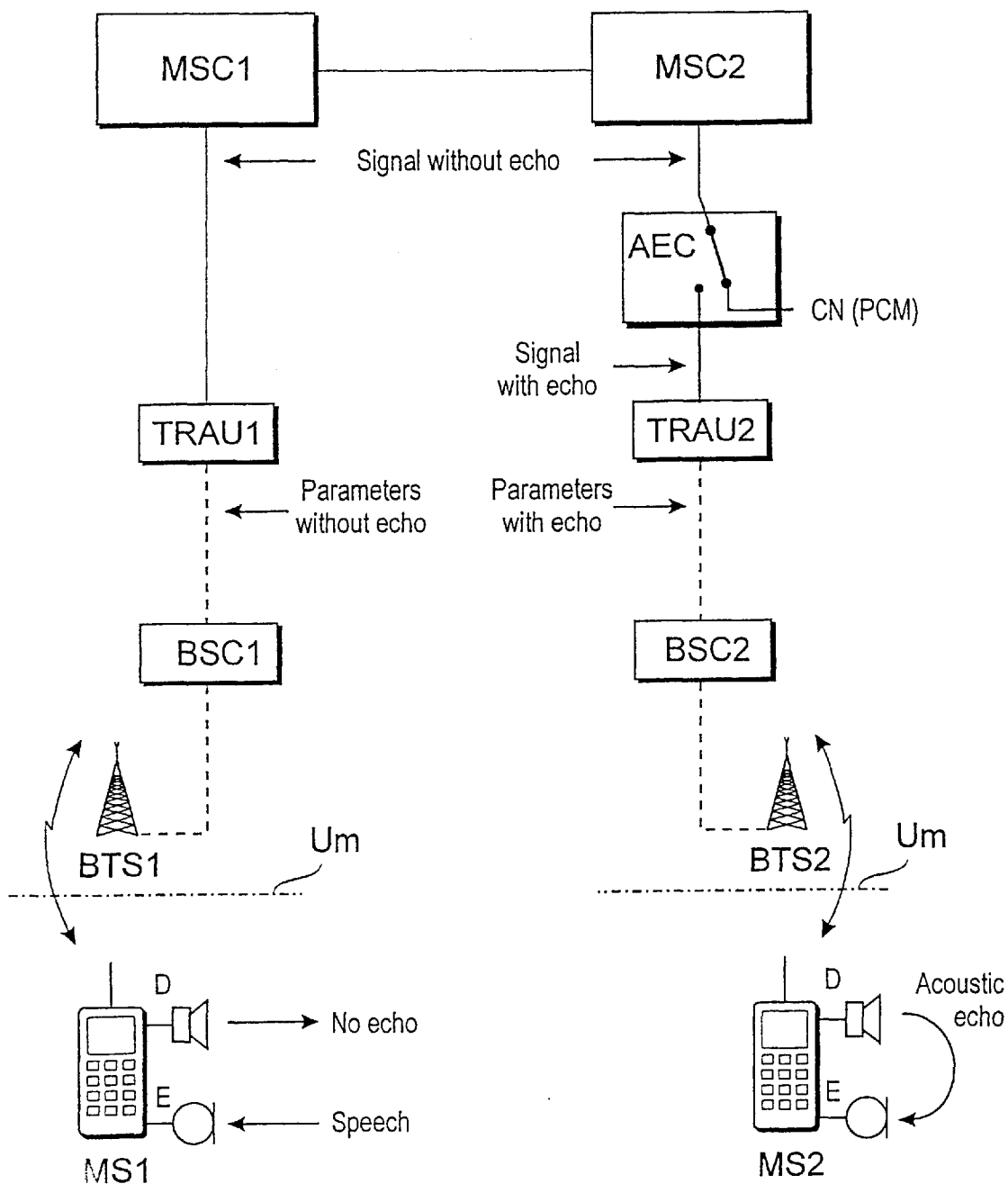
Figure 4:
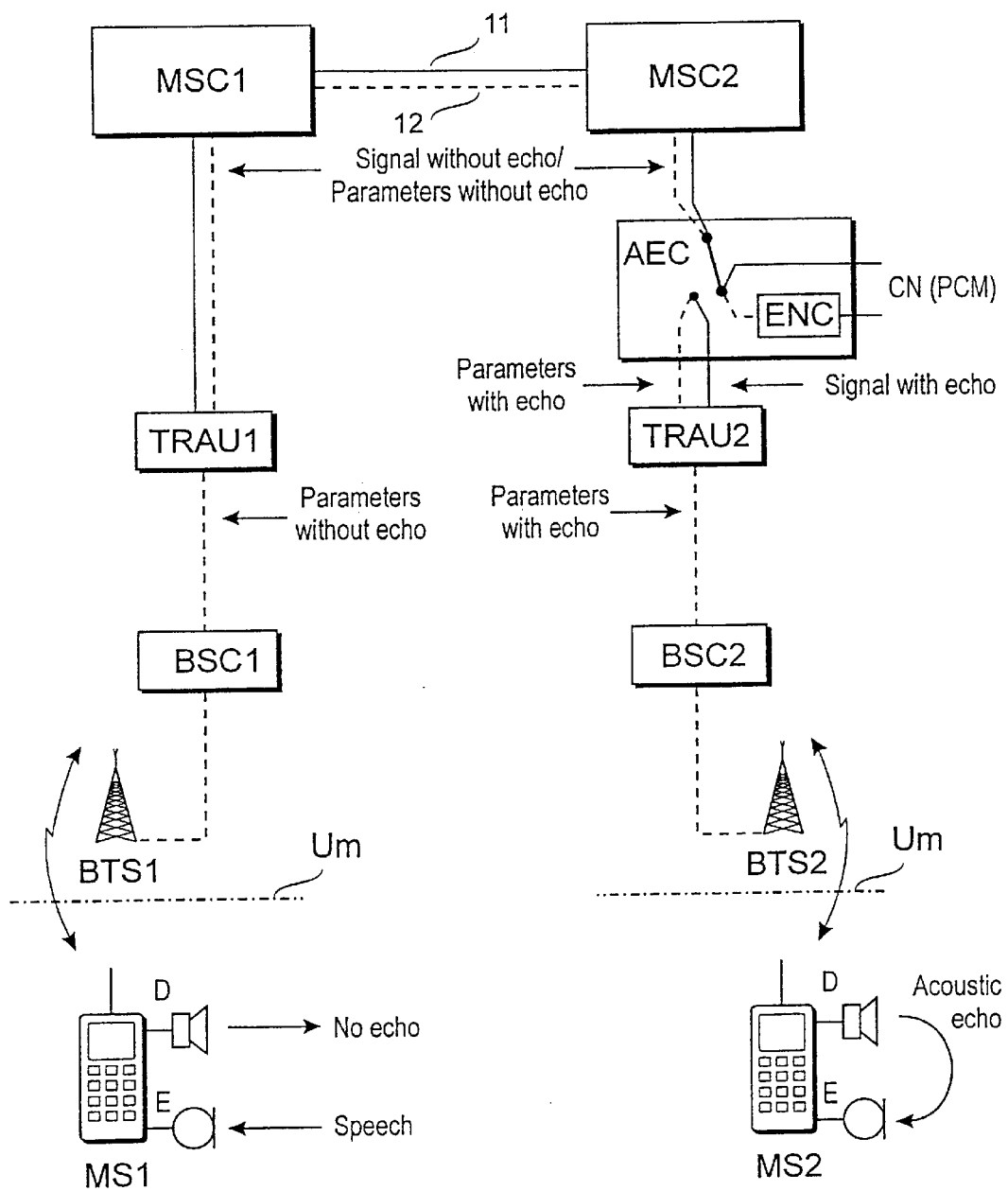
FIG. 4 presents a potential arrangement for cancelling an acoustic echo.
Figure 5:
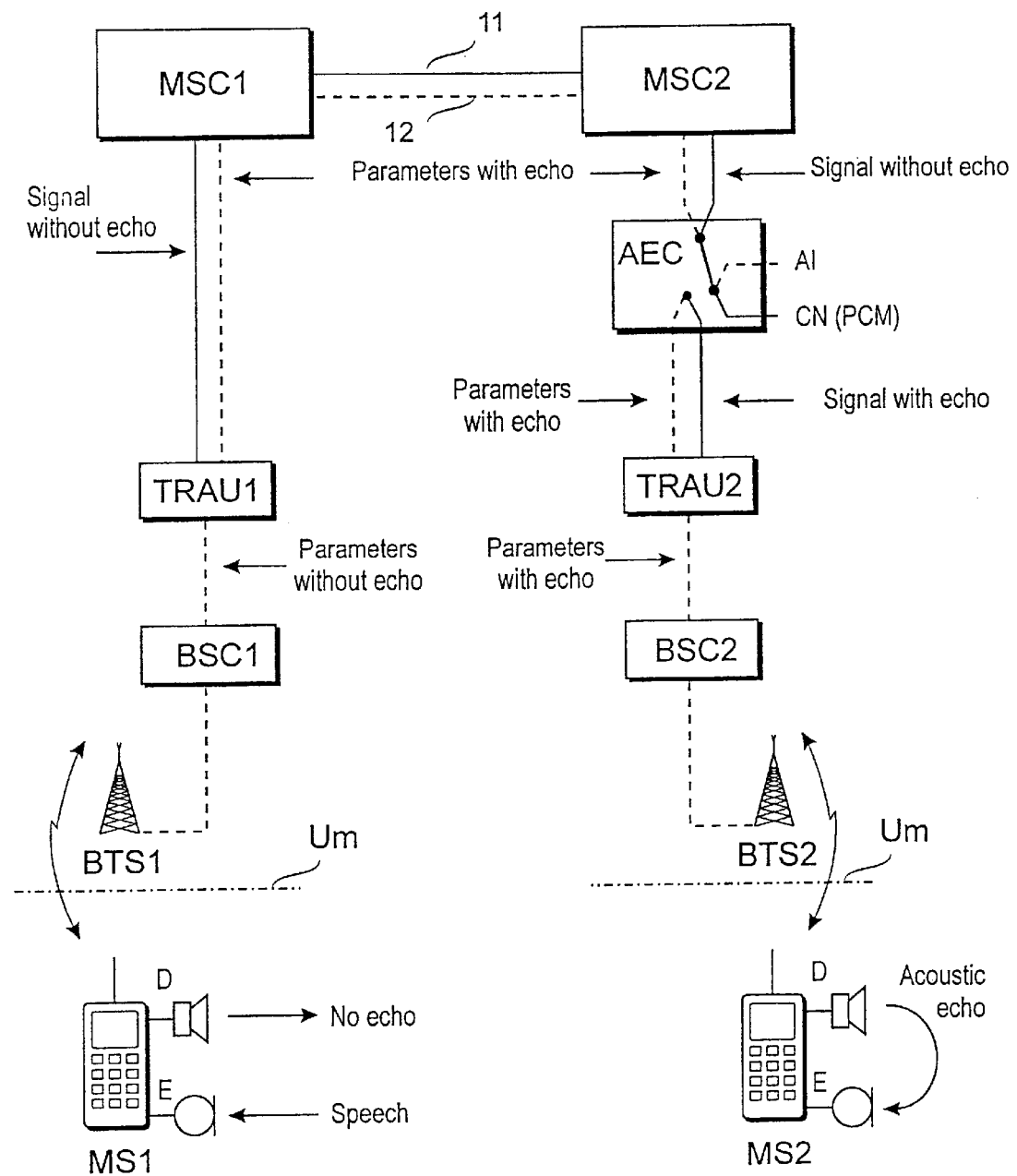
FIG. 5 presents an arrangement according to a preferred embodiment of the invention for cancelling an acoustic echo.

Referring to FIG. 5, the operation of a preferred embodiment of the echo canceller of the invention is described. As in the figures described below, a situation is described wherein the user of MS1 is the speaker, and an acoustic echo is formed at a mobile station MS2. In the example in FIG. 5 (as in FIG. 3), an echo canceller AEC monitors downlink speech activity (MSC2→MS2). When the AEC detects downlink speech activity, it replaces an uplink speech signal (MS2→MSC2) by comfort noise CN. The comfort noise is generated as PCM samples. The echo canceller AEC monitors the PCM samples coming from a transcoder TRAU2. If the echo canceller AEC detects that TFO is active and the echo should be cancelled, the echo canceller replaces the original PCM samples by comfort noise except for TFO information travelling in the least significant bits. In addition, in accordance with the invention, the AEC generates additional information (AI) indicating that instead of the speech data 12 in a parametric format, the PCM samples transmitted simultaneously are used. In response to the additional information AI, a transcoder TRAU1 on the speaker side (in this case the mobile station MS1) is required to encode the speech transmitted to the mobile station MS1 by using the PCM samples generated by the echo canceller and should not transmit the speech data in a parametric format as such to the mobile station MS1. In other respects, the transcoder TRAU1 operates in a normal manner (other modifications are not required to the TFO operation).

Additional information AI of for example 1 bit for each TRAU frame is sufficient. The additional information can be interpreted in the transcoder on the speaker side (in the figures, TRAU1) for example in such a way that during such a TRAU frame wherein said bit is in echo cancellation state, parameters containing an echo and being transmitted in a TFO subchannel are not used, but, instead, the comfort noise is encoded from the PCM samples.

FIG. 6 is a flow diagram illustrating a manner of implementing a preferred embodiment of the invention. Steps 61 to 64 relate to the operation of an echo canceller, and steps 65 to 67 relate to a transcoder. In step 61, the echo canceller AEC checks if conditions are fulfilled for replacing a speech signal by comfort noise CN. A set of criteria for generating comfort noise is presented in reference 2. If the criteria are fulfilled, the echo canceller replaces in step 62 the speech signal by comfort noise. In step 63 it is checked if TFO preventing tandem coding is active, and if so, the echo canceller generates in step 64 additional information AI to a transcoder TRAU1 on the speaker side.

In step 65, the transcoder TRAU1 monitors if additional information is present. When the additional information AI is detected, the transcoder TRAU1 encodes in step 66 a speech signal from the PCM-format comfort noise generated by the echo canceller AEC. If additional information is not present, the transcoder TRAU1 proceeds with the normal TFO operation.

A mechanism for transmitting the additional information AI between the echo canceller AEC and the transcoder TRAU1 is presented in reference 1.

The operation of the invention of the present application is a kind of hybrid of the TFO operation and the AEC operation. Normal speech is transmitted in accordance with the TFO operation (tandem coding prevented), but comfort noise is generated in PCM-format. At the same time, additional information is transmitted from the echo canceller AEC to the transcoder TRAU1, the additional information indicating that the transcoder TRAU1 is to encode the speech signal to be transmitted to the mobile station MS1 by using the PCM-format comfort noise which is generated by the echo canceller AEC.

For the sake of clarity, the invention has been described by applying terms used in the GSM system, particularly with respect to speech coding in a parametric format below the transcoder and in the PCM format (A-law samples or µ-law samples) above the transcoder. However, the invention is not restricted to that, but it can also be applied to other mobile systems where a first coding format on the mobile stations side and a second coding format on the mobile exchanges side can be recognized. It is obvious to those skilled in the art that progress in technology enables the basic idea of the invention to be implemented in various ways. The invention and the embodiments are thus not restricted to the examples described above but can vary within the scope of the claims.

REFERENCES

1. Finnish patent application FI951807/PCT published specification WO96/32823 "Transkooderi, jossa on tandemkoodauksen esto"—inventor Matti Lehtimäki.
2. Finnish patent application FI952833/PCT published specification WO96/42142 "Akustisen kaiun poisto digitaalisessa matkaviestinjärjestelmässä"—inventor Jyri Suvanen et al.

What is claimed is:

1. An arrangement for cancelling an echo returning to a first mobile station from a second mobile station in a mobile system comprising in addition to said mobile stations:
    at least one mobile exchange;
    a first transcoder and a second transcoder in such a way that the first and the second mobile stations are connected to said mobile exchanges through the first and the second transcoder, respectively, and the transcoders are arranged to convert a speech signal from a first coding format on the side of the mobile stations to a second coding format on the side of the mobile exchanges, and vice versa;

tandem free operation for transmitting the speech signal entirely in the first coding format in response to the tandem free operation being active and both parties of a call being able to use the first coding format;

at least one acoustic echo canceller between the mobile exchanges and the second mobile station;

predefined criteria have been defined for the echo canceller upon the fulfilment of which the echo canceller replaces an uplink speech signal of the second mobile station by comfort noise coded in the second coding format;

the echo canceller generates additional information if the tandem free operation is active and if the conditions for replacing the speech signal by the comfort noise are fulfilled at the same time; and in response to said additional information, the first transcoder encodes the speech signal to be transmitted to the first mobile station by using the comfort noise coded in the second coding format that is generated by the echo canceller.

2. The arrangement as claimed in claim 1, wherein in the first coding format, the speech signal is coded into a parametric format, and in the second coding format, the speech signal is coded into pulse code modulation samples.

3. The arrangement according to claim 2 wherein the pulse code modulation samples are A-law samples.

4. The arrangement according to claim 2, wherein the pulse code modulation samples are $\mu$-law samples.

5. An acoustic echo canceller arranged to:

operate in a mobile system comprising a first coding format on the side of mobile stations and a second coding format on the side of mobile exchanges, and at least one transcoder for converting a speech signal between said coding formats, and tandem free operation for transmitting the speech signal entirely in the first coding format in response to the tandem free operation being active and both parties of a call being mobile subscribers;

replace an uplink speech signal of the mobile station by comfort noise coded in the second coding format when the predefined criteria are fulfilled;

monitor if the tandem free operation is active; and generate additional information to the transcoder in a forward direction of an echo in response to the tandem free operation being active and the criteria for replacing the speech signal by comfort noise being fulfilled at the same time, wherein the additional information instructs the transcoder to encode the speech signal to be transmitted to the mobile station by using the comfort noise coded in the second coding format that is generated by the echo canceller.

6. The echo canceller as claimed in claim 5, further arranged to monitor speech activity in the downlink direction of a second mobile station, and having detected downlink speech activity, to replace an uplink speech signal of the second mobile station by comfort noise.

7. A transcoder arranged to:

operate in a mobile system comprising a first coding format on the side of mobile stations and a second coding format on the side of mobile exchanges, and convert a speech signal between said coding formats, the mobile system further comprising an echo canceller arranged to replace an uplink speech signal of the mobile station by comfort noise coded in the second coding format when the predefined criteria are fulfilled;

monitor additional information generated by the echo canceller; and in response to said additional information, to encode a downlink speech signal by using the comfort noise coded in the second coding format that is generated by the echo canceller.

\* \* \* \* \*